United States Patent [19]

Ebner et al.

[11] 4,068,961
[45] Jan. 17, 1978

[54] SWIVEL JOINT

[75] Inventors: John Steven Ebner, Boca Raton; Francis Charles Pizzeri, Miami Shores; Charles Grimes Sprecher, III, Pembroke Pines, all of Fla.

[73] Assignee: Milgo Electronic Corporation, Miami, Fla.

[21] Appl. No.: 716,379

[22] Filed: Aug. 23, 1976

[51] Int. Cl.² .............................................. F16B 7/10
[52] U.S. Cl. ....................................... 403/55; 403/61; 403/116; 403/117; 248/181
[58] Field of Search .......................... 403/53, 55, 57, 59, 403/61, 63, 113, 114, 116, 117, 122, 123, 124, 125, 126; 248/178, 181, 183, 184, 23

[56] References Cited

U.S. PATENT DOCUMENTS

| 562,901 | 6/1896 | Lambert | 403/114 |
| 1,987,726 | 1/1935 | Wilkerson et al. | 248/23 |
| 3,902,816 | 9/1975 | Moore | 403/114 |

Primary Examiner—Andrew V. Kundrat
Attorney, Agent, or Firm—Jackson & Jones

[57] ABSTRACT

A swivel joint is designed to provide limited and controlled movement in two orthogonal planes running through its symmetrical center. The three major parts of the swivel joint are molded from a material composition of polycarbon-glass-teflon. A swivel top mounts to the object to be provided with controlled movement. A swivel bottom mounts to a support. The swivel top and bottom are held together by a large, curved wafer and a nut and bolt arrangement. The swivel top and bottom interact with each other to provide controlled limited movement in the two orthogonal planes, simultaneously.

10 Claims, 4 Drawing Figures

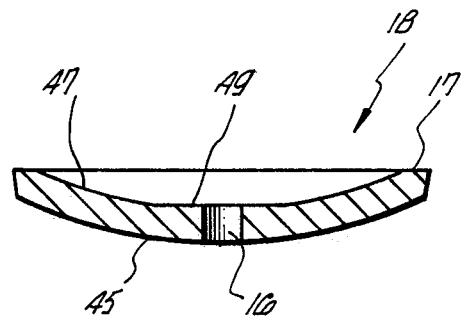
FIG_2_
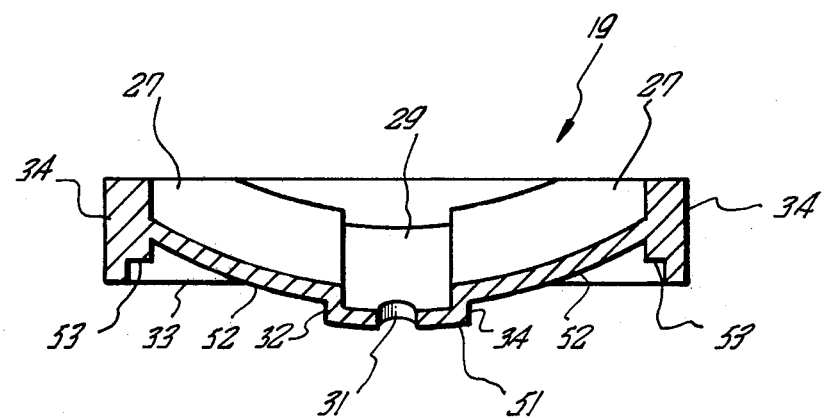
FIG_3_
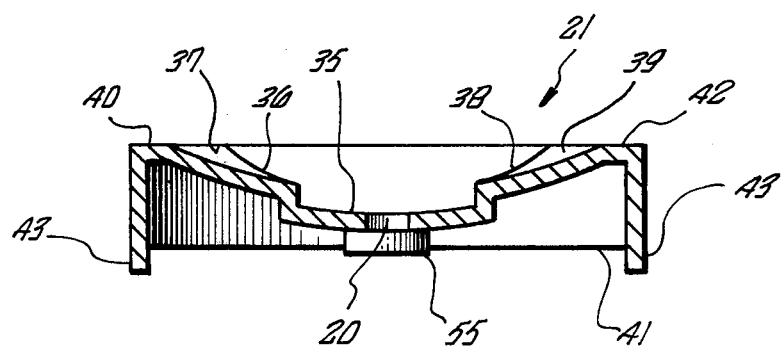
FIG_4_

SWIVEL JOINT

BACKGROUND OF THE INVENTION

The present invention relates generally to improvements in swivel joints, and more particularly, pertains to new and improved limited movement swivel joints wherein controlled movement in two orthogonal planes is provided.

Limited movement swivel joints that have been used heretofore have exhibited the problems of being difficult to maneuver, or binding up, and failing. Those swivel joints that do not readily exhibit this characteristic are complicated devices that, for example provide locking positons and, therefore, are necessarily expensive to manufacture. The universal movement swivel joint, such as a gimbal, although providing for movement in two orthogonal planes simultaneously, does not provide for limited movement in those planes. Nor does it limit movement to just two orthogonal planes. In order for the gimbal mechanism to have a long service life, a high quality material such as stainless steel is normally utilized, thereby again resulting in high manufacturing costs.

OBJECTS AND SUMMARY OF THE INVENTION

An object of this invention is to provide a swivel joint having only three major components that facilitates controlled movement of a relatively heavy object in two orthogonal planes, simultaneously.

This object and the general purpose of the invention is provided by a swivel joint having three major parts, each part being molded from a material composition of polycarbonate, glass and teflon. A wafer having a certain convex surface of curvature rests within a recess in a swivel top. The diameter of the wafer determines the degree of movement permitted in a first orthogonal plane. The swivel top mounts to an object to be moved. The swivel top has a recess therein which has a defined concave surface of curvature, this curvature being equal to the convex surface of curvature of the wafer. This recess has a slot therein, said slot having a second convex surface of curvature and an oblong aperture therein. The aperture has its longer axis parallel to the longer side of said slot. A swivel bottom cylindrical in shape, having a diameter slightly smaller than the width of the swivel top, has a concave surface of curvature equal to the second convex surface of curvature of the slot in the swivel top. A pair of pie-shaped segments rest on the second concave surface of curvature of the bottom swivel. These pie-shaped segments interact with the edges of the slot on the swivel top to determine the degree of movement permitted in a second orthogonal plane. The swivel bottom fastens to a stationary member. The three major parts are held together in a nested manner by a nut and bolt arrangement.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the Figures thereof and wherein:

FIG. 2 is a cross-section of the wafer 18 of FIG. 1.

FIG. 3 is a cross-section of the swivel top 19 of FIG. 1.

FIG. 4 is a cross-section of the swivel bottom 21 of FIG. 1.

BRIEF DESCRIPTION OF THE PREFERRED EMBODIMENTS

Figure 1:
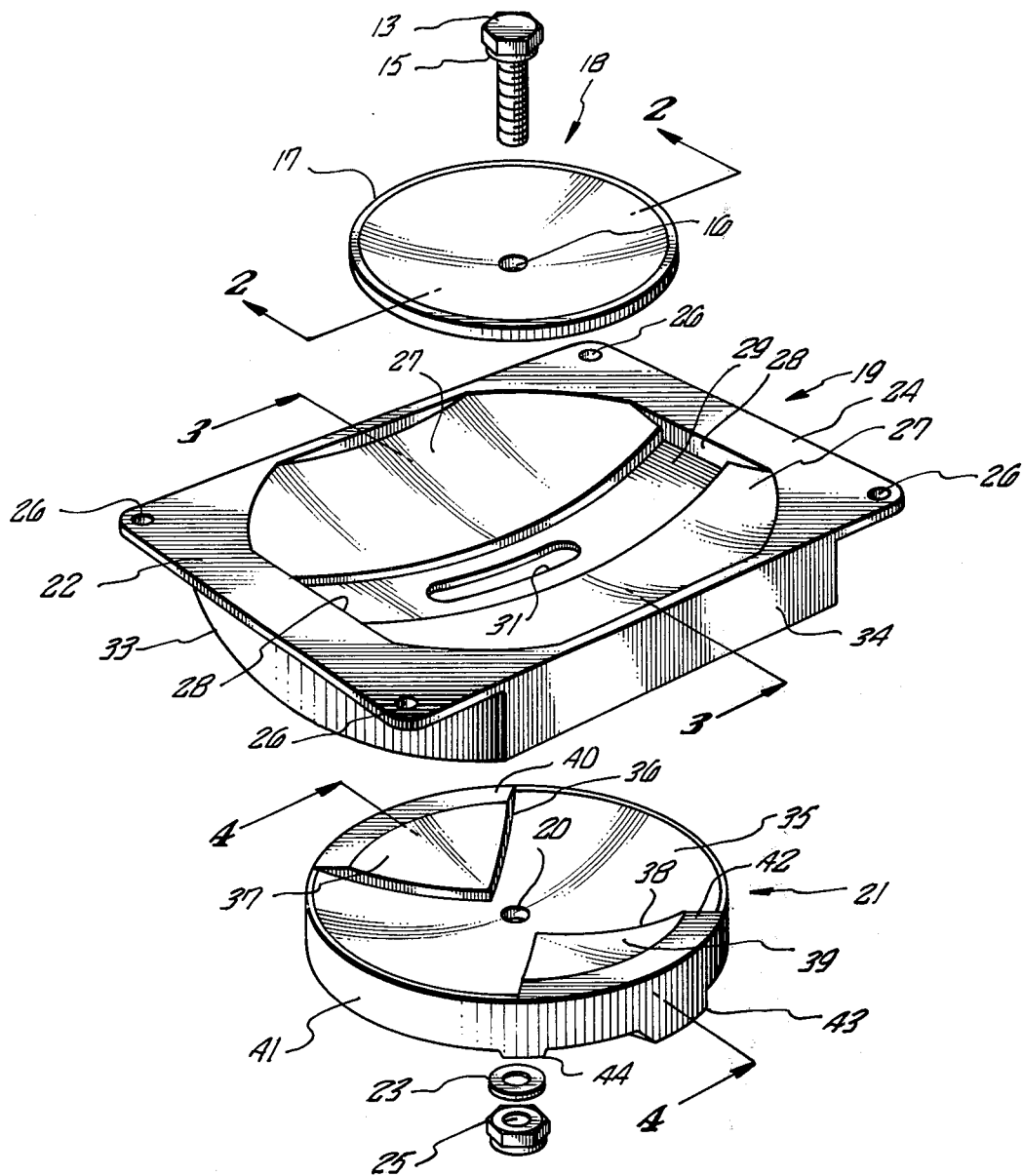
FIG. 1 is an exploded perspective of a swivel joint according to the present invention.

All the major components of the swivel joint of the present invention are illustrated in FIG. 1. The swivel joint provides limited controlled movement of an object mounted thereto in two orthogonal planes. The swivel bottom 21 provides circular rotating movement in a plane in which the swivel bottom 21 is located. The swivel top 19 provides pivotal movement in a plane perpendicular to the plane in which the swivel bottom 21 provides circular movement. The curved wafer 18 limits the pivotal movement of the swivel joint and provides sufficient friction along the pivotal path to maintain an object mounted to the swivel joint at any point along this pivotal path. The bolt 13 and nut 25 maintain the 3 major components 18, 19 and 21 of the swivel joint in a nested relationship.

The curved wafer 18, swivel top 19 and the swivel bottom 21 are each molded from a material that has as its major components polycarbonate, short glass fibers, and teflon. A preferred mix of these three materials has been found to be slightly over 50% polycarbonate, the other 50% being made up of short glass fibers and teflon. The mix of these three materials is adjusted to provide components that are durable and can support considerable weight thereon while still providing a sliding relationship between the curved wafer 18, swivel top 19 and the swivel bottom 21.

The wafer 18 has a circular perimeter of a defined diameter and an aperture 16 through its symmetrical center. As can be seen from FIG. 2 which is a cross-sectional view along line 22 of the perspective in FIG. 1, the wafer has a certain thickness and a first surface of curvature 45 at a defined radius of curvature along its convex surface, and another surface of curvature 47 having a differently defined radius of curvature along its concave surface. The radius of curvature defining the surface of curvature 47 is slightly smaller than the radius of curvature defining the surface of curvature 45, thereby leaving a flat perimeter 17 around the periphery of the wafer 18. In order to facilitate the seating of a bolt 13 and washer 15, the area 49 around the aperture 16 is flattened. The diameter of the wafer 18 is chosen so that it fits within the recess of the swivel top 19, slidably engaging the concave surface of curvature 27 of the recess. As the swivel top causes pivotal motion in a vertical plane, the wafer 18 moves back and forth between the edges 28 of the recess of swivel top 19. The diameter of the wafer 18, therefore, defines the degree of pivotal motion in the vertical plane. The larger the diameter of the wafer 18, the less pivotal motion there will be, and vice versa.

The swivel top 19 has a generally rectangular perimeter, having apertures 26 at its four corners to accommodate screws or nut and bolt arrangement for fastening the swivel top to an object to be moved. It is found to be most advantageous to mount the swivel top 19 at the center of gravity of the object to be moved.

The swivel top 19 has a pair of flat surfaces 22 and 24 at opposite ends of its perimeter along its shorter edges. Swivel top 19 has a skirt therearound which is made up of a pair of flat sides 34 along its two longer sides, and a pair of curved sides 33 along its two shorter sides.

A recess is formed in the swivel top 19. This recess consists of a concave surface of curvature 27 having the same radius of curvature as the radius of curvature of the first surface of curvature 45 of the wafer 18. This first surface of curvature 27 of the recess in the swivel top 19 has a groove 29 therein which is parallel to the longer sides of the swivel top 19. This groove is terminated by the pair of edges 28. The groove has an oblong aperture 31 therein which traverses the symmetrical center of the swivel top 19. The longer axes of the oblong aperture 31 is parallel with the longer sides of the swivel top.

FIG. 3 illustrates the cross-section of the swivel top 19 taken along cross-section line 33. The groove 29 in the recess of the swivel top 19 has a convex surface of curvature 51 which is defined by a radius of curvature that is different from the radius of curvature that defines the first surface of curvature 27 of the swivel top. This convex surface of curvature 51 can be thought of as the second operative surface of curvature of the swivel top 19. Another convex surface of curvature 52 of the recess in the swivel top 19 has a radius of curvature that is different from the first and second surface of curvatures on the swivel top, and can be though of as a third surface of curvature. A pair of ridges, running along adjacent to the flat skirts 34 of the swivel top 19 have a concave surface 53 that is defined by a certain radius of curvature.

The swivel bottom 21 is preferably circular in shape, and has a skirt 41 therearound. The diameter of the swivel bottom 21 is chosen to be slightly smaller than the distance between the internal surfaces of the two flat skirts 34 on the swivel top 19. The swivel bottom 21 has a concave surface of curvature 35 that is defined by the same radius of curvature that defines the convex surface of curvature 51 of the swivel top. The surface of curvature 35 has a pair of pie-shaped wedge segments formed thereon, each segment having a surface of curvature 37 and 39 respectively, which is defined by a radius of curvature that defines the convex surface of curvature 52 of the swivel top 19.

Both pie-shaped segments have a flat portion 40 and 42 respectively, along the perimeter of the circular swivel bottom 21. An aperture 20 located at the symmetrical center of the swivel bottom 21 is large enough to accommodate the bolt 13. The skirt 41 of the swivel bottom has formed therein as a part thereof, a pair of extensions 43, which are designed to fit into apertures, such as guide slots, in a stationary object. The swivel bottom 21 is fastened to such stationary object by means of threaded bolts that engage swivel bottom 21 at three threaded bosses, one of which, 44, is shown in FIG. 1, and another of which, 55, is shown in FIG. 4. FIG. 4 is a cross-section of the swivel bottom 21, taken along line 4—4 in FIG. 1.

In operation, the wafer 18, swivel top 19, and swivel bottom 21 nest together and are held in place by bolt 13 and lock nut 25. A pair of washers 15 and 23 are also utilized. In an operative relationship, the convex first surface of curvature 45 of the wafer 18 engages the concave first surface of curvature 27 of the swivel top. The convex second surface of curvature 51 of the swivel top engages the concave second surface of curvature 35 of the swivel bottom, and the convex third surface of curvature 52 on the swivel top engages the concave third surface of curvature 37 and 39 of the pie-shaped segments on the swivel bottom. With the swivel bottom 21 held stationary by a stationary object fastened thereto as above described, the swivel top 19 will rotate about its axis, defined by the aperture 20 and the bolt 13 left and right around the perimeter of the swivel bottom 21 to the extent permitted by the pie-shaped segments 37 and 39. The edges 36 and 38 of the segments 37 and 39 abutt the edges 32 and 34 defined by the groove 29 in the swivel top 19. The swivel top 19 will slide back and forth along the second surface of curvature 35 of the swivel bottom in a path defined by the oblong aperture 31 of the swivel top to an extent permitted by the diameter of the wafer 18 in a manner above described.

What has been described is a swivel joint that has only three major components and facilitates controlled movement of a relatively heavy object in two orthogonal planes simultaneously. Obviously, many modifications and variations of the present invention are possible in light of the above teachings. It is to be understood, therefore, that within the scope of the appended claims, the invention may be practiced otherwise than as specifically described.

What is claimed is:

1. A swivel joint for permitting limited movement in two orthogonal planes, comprising:
    a swivel top having a recess therein, said recess having a surface of curvature defined by a first radius, an oblong aperture located adjacent said surface of curvature, its longer axis lying in a first orthogonal plane;
    a swivel bottom, having a surface of curvature defined by a second radius, two riser segments on the second radius surface of curvature, and an aperture in said second radius surface of curvature; and
    means for holding said swivel top and swivel bottom together in a nested slidable relationship.

2. The swivel joint of claim 1, further comprising:
    a groove in the surface of curvature of said swivel top having a surface of curvature defined by a radius substantially equal to said second radius, said oblong aperture located on the surface of curvature of said groove with its longer axis oriented parallel to the longer axis of said groove.

3. The swivel joint of claim 2, wherein said two riser segments are pie-shaped segments having a surface of curvature defined by a third radius.

4. The swivel joint of claim 3, wherein the backside of the surface of curvature of said swivel top is defined by a radius equal to said third radius defining the surface of curvature of the pie-shaped segments.

5. The swivel joint of claim 1, wherein said two riser segments are pie-shaped segments having a surface of curvature defined by a third defined radius.

6. The swivel joint of claim 5 wherein the backside of the surface of curvature of said swivel top is defined by a radius equal to said third radius defining the surface of curvature of the pie-shaped segments.

7. The swivel joint of claim 1, further comprising a wafer resting within the recess of said swivel top, said wafer having a surface of curvature defined by a radius equal to said first radius.

8. The swivel joint of claim 7 further comprising:
    a groove in the surface of curvature of said swivel top having a surface of curvature defined by a radius substantially equal to second radius, said oblong aperture located on the surface of curvature of said groove with its longer axis oriented parallel to the longer axis of said groove.

9. The swivel joint of claim 8 wherein said two riser segments are pie-shaped segments having a surface of curvature defined by a third radius.

10. The swivel joint of claim 1, wherein said swivel top is adapted for mounting to a first object, and wherein said swivel bottom is adapted for mounting to a second object.

* * * * *